United States Patent [19]
Witzig

[11] 3,983,905
[45] Oct. 5, 1976

[54] CONVOLUTELY WOUND TUBE HAVING READILY CONFORMABLE EDGE PORTIONS

[75] Inventor: Werner Witzig, Hartsville, S.C.
[73] Assignee: Sonoco Products Company, Hartsville, S.C.
[22] Filed: July 30, 1971
[21] Appl. No.: 167,731

Related U.S. Application Data
[63] Continuation-in-part of Ser. No. 845,847, July 29, 1969, Pat. No. 3,613,738.

[52] U.S. Cl. .............................. 138/156; 138/151; 138/170
[51] Int. Cl. .............................................. F16l 9/18
[58] Field of Search ............ 138/128, 141, 151, 156, 138/143, 144

[56] References Cited
UNITED STATES PATENTS

| | | | |
|---|---|---|---|
| 267,326 | 11/1882 | Childs | 138/151 X |
| 2,409,249 | 10/1946 | Brown | 138/144 |
| 3,566,925 | 3/1971 | Sagara et al. | 138/151 X |
| 3,613,738 | 10/1971 | Witzig | 138/156 |

*Primary Examiner*—Charles A. Ruehl
*Attorney, Agent, or Firm*—Dennison, Dennison, Meserole & Pollack

[57] ABSTRACT

A convolutely wound tube having portions adjacent the inside and outside edges thereof more pliable than the remainder thereof for easily conforming to the contour of the inside and outside surfaces thereof and method for making same from a predetermined length of elongate sheet material having opposed first and second surfaces and first and second longitudinal side edges, wherein the method includes mechanically deforming a minor portion of the sheet material adjacent the first or second longitudinal edge, or both, thereof to render same more pliable than the major portion of the sheet material, convolutely winding a predetermined length of the elongate sheet material transversely of the length into a convolute tube while forming the inside edge of the tube from the first longitudinal edge and the outside edge of the tube from the second longitudinal edge of the sheet material so that the pliable portion of the sheet material adjacent the inside and outside edges will readily conform to the contour of the inside and outside surfaces of the convolute tube, and securing the convolute tube in the wound condition with a flop formed by the second longitudinal edge.

4 Claims, 8 Drawing Figures

INVENTOR

WERNER WITZIG

BY Gordon McBride

ATTORNEY

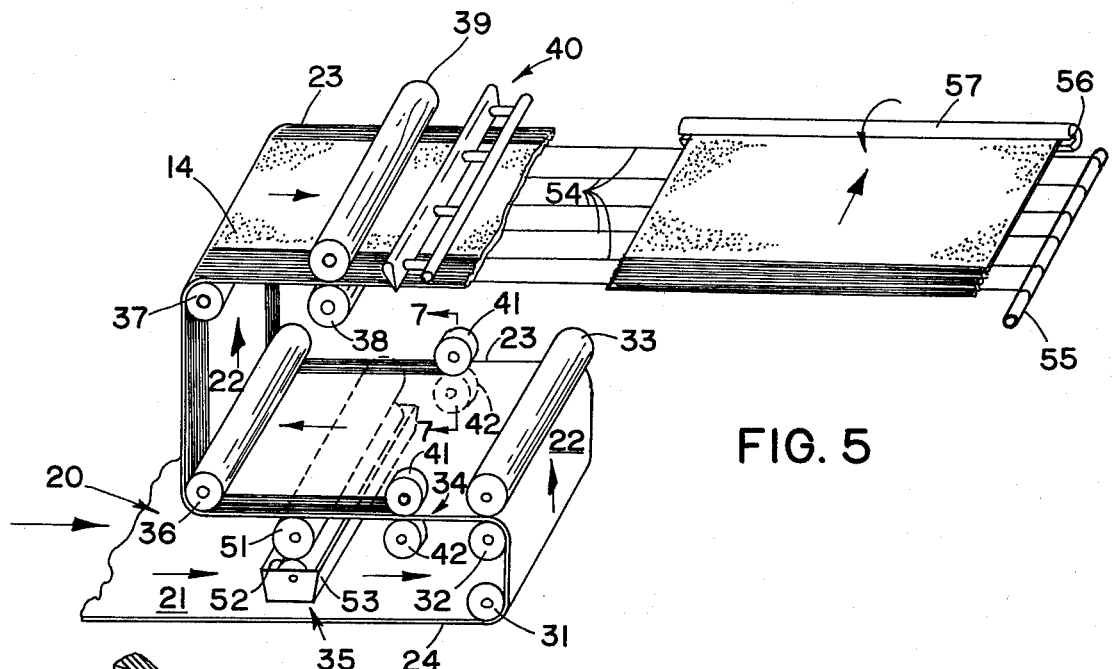
FIG. 5
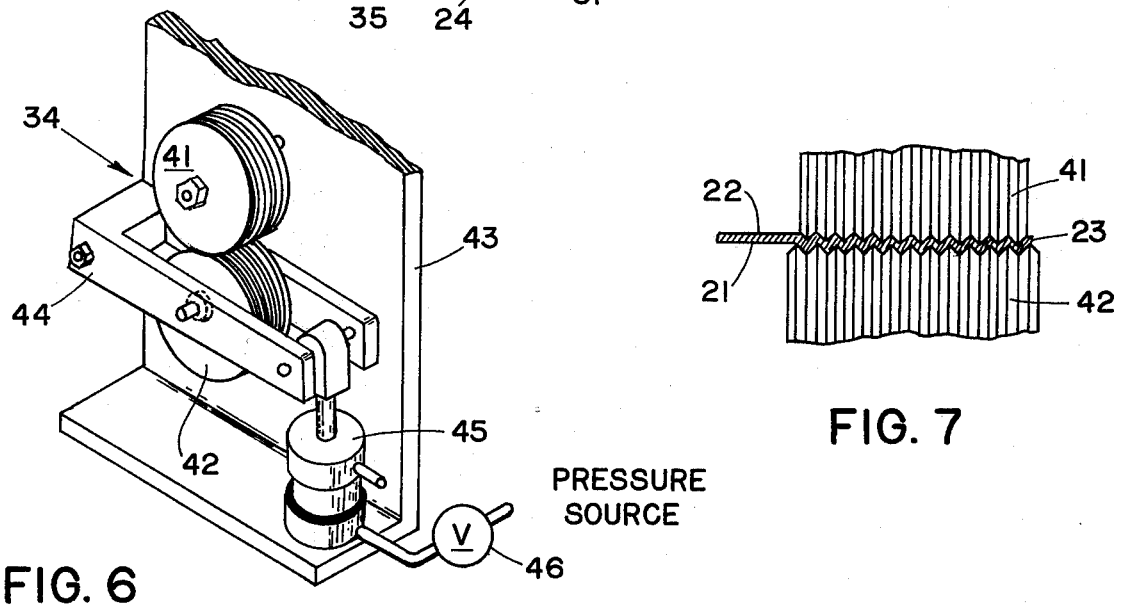
FIG. 6
FIG. 7
PRESSURE SOURCE
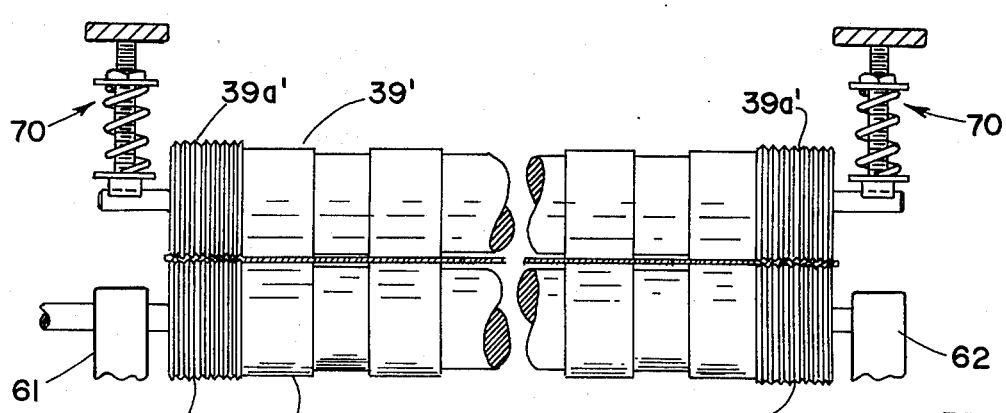
FIG. 8

CONVOLUTELY WOUND TUBE HAVING READILY CONFORMABLE EDGE PORTIONS

This application is a Continuation-In-Part of copending application Ser. No. 845,847, filed July 29, 1969, in the name of Werner Witzig and assigned to the assignee hereof, now U.S. Pat. No. 3,613,738.

This invention generally relates to a convolutely wound tube made from elongate sheet material such as paper, plastic and the like, but more particularly to an elongate convolutely wound tube having a readily conformable portion adjacent the inside and/or outside edge and a method for making same, as well as an apron tube.

Heretofore, convolutely wound tubes have been made from elongate sheet material such as paper, plastic and the like by convolutely winding a predetermined length of the elongate sheet material transversely of the length thereof into a tube and securing the tube in the wound condition by such means as an adhesive between the convolute windings. However, depending on the physical properties of the sheet material used, particularly thicker and/or stiffer materials, it is often difficult to conform the portion of the sheet material adjacent the edges of the convolute tube to the contour of the surfaces thereof and in such instances, it is especially difficult to secure the inside edge of the convolute tube to the next outer convolute winding. It is of even greater difficulty to cause the apron to conform to the outer surface of the tube without using some type of securement, such as adhesive.

Furthermore, it is conventional practice in convolutely winding the sheet material to insert one of the longitudinal edges thereof into a longitudinally extending groove of a mandrel to hold the sheet material relative to the mandrel during rotation thereof in winding of the sheet material. As a result, the portion of the sheet material held in the mandrel and which becomes the inside edge of the convolute tube is not formed to the contour of the inside surface of the convolute tube and is not thereafter readily conformable to the contour of the inside surface of the convolute tube or securable to the next outer convolute winding. Also, the portion of the sheet material which would normally form the outer convolute winding is not secured such that a loose portion or apron is formed which is deformed and made more pliable to permit packaging thereof.

With the aforementioned in mind, it is an object of this invention to provide an improved convolutely wound tube and method for making same from elongate sheet material such as paper, plastic and the like wherein means are provided for mechanically deforming a minor portion of the sheet material adjacent the inside, outside or both edges of the convolute tube to render same more pliable than the major portion thereof, thus, rendering the minor portion readily conformable to the contour of the surface of the convolute tube and enabling its securement to the next outer convolute winding and permitting formation of an outer apron conformable to the outer surface of the convolute tube to provide a starter portion on the completed tube.

By this invention, it has been found that the above object may be accomplished by providing a method of making convolutely wound tubes which includes the steps of mechanically deforming a minor portion of the sheet material adjacent a first or second longitudinal edge thereof to render same more pliable than the major portion of the sheet material, preferably by corrugating the sheet material immediately adjacent the first or second longitudinal edge thereof with the corrugations extending longitudinally of the sheet material, convolutely winding a predetermined length of the elongate sheet material transversely of the length thereof into a convolute tube while forming the inside edge of the tube from the first longitudinal edge of the sheet material so that the minor portion of the sheet material adjacent the inside edge will readily conform to the contour of the inside surface of the convolute tube, and securing the convolute tube in the wound condition such that the second edge conforms to the outer surface of tube.

The improved convolutely wound tube comprises a plurality of overlying convolute windings of the sheet material secured in the wound condition and including inside and outside surfaces and inside and outside edges formed by the opposed surfaces and the longitudinal edges of the sheet material, a minor portion of the sheet material adjacent the inside or outside edge of the convolute tube including mechanically deformed means rendering the sheet material more pliable than the major portion thereof and readily conformable to the contour of the surfaces of the convolute tube.

Some of the objects and advantages of the invention having been stated, others will appear as the description proceeds, when taken in connection with the accompanying drawings, in which:

FIG. 5 is a somewhat schematic perspective view of a method of making convolutely wound tubes with the convolute winding machine of FIG. 4 in accordance with this invention;

FIG. 6 is a perspective view of an apparatus which may be used in rendering a minor portion of the sheet material adjacent the longitudinal edge thereof more pliable than the major portion of the sheet material;

FIG. 7 is an enlarged sectional view with portions broken away taken substantially along the line 7—7 of FIG. 5 and illustrating a method of rendering a minor portion of the sheet material adjacent the first longitudinal edge thereof more pliable than the major portion of the sheet material; and FIG. 8 is a front elevational view broken away of a modified pair of nip driving rolls including means for rendering a minor portion of the sheet material adjacent the longitudinal edge thereof more pliable than the major portion of the sheet material.

Figure 1:
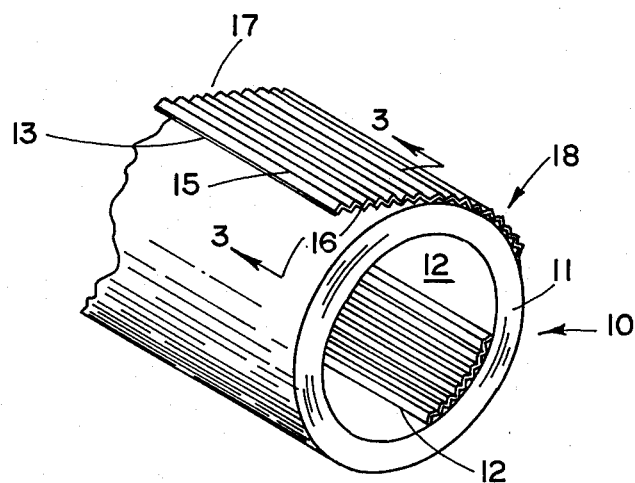
FIG. 1 is a perspective view of a portion of an elongate convolutely wound tube produced in accordance with the present invention.
Figure 3:
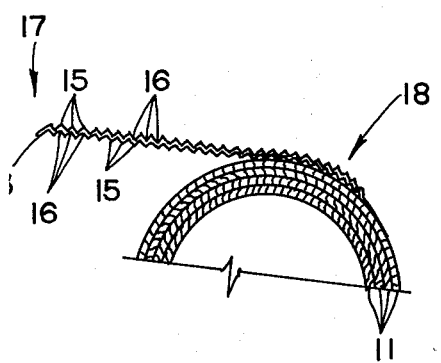
FIG. 3 is an enlarged sectional view taken substantially along the line 3—3 of FIG. 1.
Figure 2:
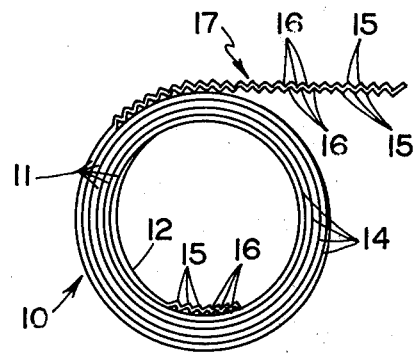
FIG. 2 is an enlarged end view of the tube of FIG. 1.
Figure 4:
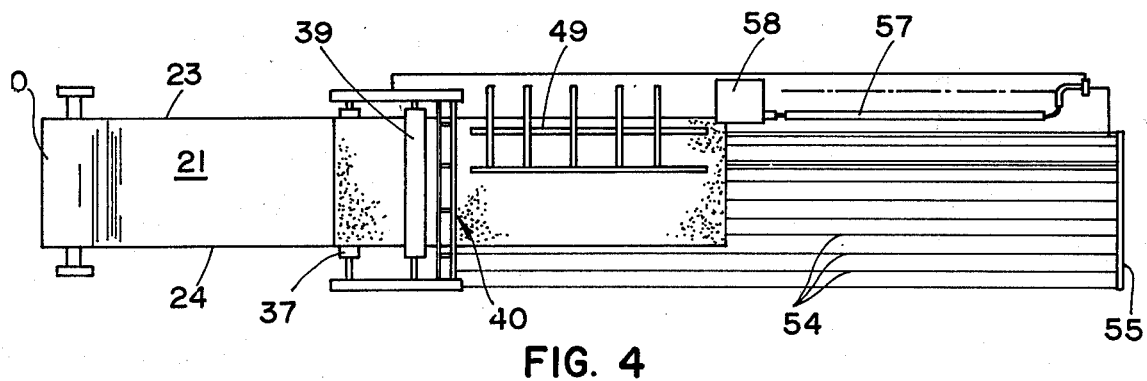
FIG. 4 is a somewhat schematic top plan view of a convolute tube winding machine which may be used in making the tube of the present invention.

Referring now to the drawings wherein like reference characters are used throughout where possible to indicate like parts, there is shown in FIGS. 1, 2 and 3 a portion of the convolutely wound tube of this invention, generally designated at 10, which may be formed from any elongate sheet material, such as paper, plastic and the like.

The convolutely wound tube 10, as illustrated, comprises a plurality of overlying convolute windings 11 of the sheet material, and includes inside edge 12 and outside edge 13 with the convolute windings 11 secured in the wound condition, preferably by adhesive 14 disposed between the convolute windings 11 and securing them in overlying relation as shown in FIGS. 2 and 3. The adhesive 14 may be of any suitable type, such as a starch paste.

The improved feature of the convolutely wound tube 10 exists in a minor portion of the sheet material adjacent inside edge 12 or outside edge 13 of the convolute tube and preferably a portion only of the sheet material forming either the inside or outside surface, or both, of the tube, wherein the minor portion includes mechanically deformed means rendering the sheet material more pliable than the major portion of the sheet material and thus, rendering the minor portion adjacent the inside edge 12 or outside edge 13 readily conformable to the contour of the surface of the convolute tube.

The means illustrated and preferred comprises corrugations which consist of a series of parallel ridges 15 and grooves 16 on opposed surfaces of the sheet material in a minor portion thereof adjacent the edges 12 or 13 of the convolute wound tube 10 and which extend longitudinally thereof. However, the mechanically deformed means could comprise any pattern of mechanically formed deformations.

With only a minor portion and preferably a portion only of the sheet material forming the inside surface of the convolute tube rendered more pliable, the crush resistance and other physical properties of the convolutely wound tube 10 remain substantially unaffected. Furthermore, it will be noted (FIG. 2) that the minor portion of the sheet material adjacent inside edge 12 by being readily conformable to the contour of the inside surface of the convolutely wound tube 10 is readily secured to the next outer convolute winding by an adhesive 14 disposed therebetween. Normally adhesive is not applied to the extreme outer portion of the outer edge 13 of convolutely wound tube 10 in order to provide an unsecured area forming an apron 17. It has been found to be advantageous to corrugate a greater portion of the sheet material than that forming the flap 17 in order that the more pliable portion 18 is secured to the next inner convolute winding by adhesive 14. The rendering more pliable of the juncture portion 18 permits securement of that portion to the outermost convolute winding of the tube 10 and provides a smooth transition from the outermost convolute winding to the flap 17. This construction permits a great degree of flexibility of flap 17 without a complete destruction of the sheet material at the location of the end of adhesive 14.

Referring now to FIGS. 4–7, it will be observed that in making the convolutely wound tube 10, paper, plastic or other elongate sheet material 20 having first and second opposed surfaces 21, 22 and first and second longitudinal side edges 23, 24 is first drawn from a roll 30 (FIG. 4) or other suitable source of supply around guide roll 31 (FIG. 5) by a pair of nip feed rolls 32 and 33. The sheet material 20 is then fed through a corrugating apparatus generally designated at 34, through an adhesive applying station generally designated at 35 and around guide rolls 36, 37 by a pair of nip feed rolls 38 and 39. The feed rolls 38 and 39 are intermittently driven by any conventional driving means (not shown) to pass a predetermined length of the sheet material 20 through a conventional cutting mechanism generally designated at 40 where the sheet material 20 is cut into predetermined lengths in accordance with the length of the tube to be formed therefrom.

The corrugating apparatus 34 is shown as rendering only a minor portion of the sheet material 20 immediately adjacent the first longitudinal edge 23, preferably a portion of a width substantially less than the circumference of the inside surface of the convolute tube to be formed, more pliable than the major portion of the sheet material 20. It is to be understood that corrugating apparatus 34 may be located on either edge 23 or 24, or both, for scoring sheet material 20 at the desired edge depending on the configuration of the tube being formed. While the minor portion may be rendered more pliable in accordance with numerous techniques, the technique illustrated and found commercially advantageous comprises corrugating, which as set forth above consists of a series of parallel ridges 15 and grooves 16 extending longitudinally of the sheet material 20.

Referring now to FIG. 6, one side of one form of corrugating apparatus 34 which may be used is shown in more detail. This apparatus 34 comprises a pair of cooperating corrugating rolls 41, 42 carried in a substantially horizontal position by a support frame 43 and being freely rotatable about their longitudinal axis with at least one of the rolls 42 adapted to be selectively held in pressing relation to the other roll 41 by being mounted in a collar 44 which is pivotally attached to the frame 43 at one end thereof and is attached to a pneumatic piston and cylinder 45 at the other end thereof. The piston and cylinder 45 receive a regulated supply of air from control valve 46 connected to any suitable pressure source.

Accordingly, a minor portion of the sheet material 20 immediately adjacent the longitudinal edges 23 and 24 may be passed longitudinally between the cooperating corrugating rolls 41, 42, as illustrated in FIGS. 5 and 7, to form corrugations extending longitudinally of the sheet material 20. Depending upon the physical properties of the sheet material 20 being used, the nipping pressure between the rolls 41, 42 will be controlled through valve 46 to control the penetration of the ridges of the cooperating corrugating rolls 41, 42 in the sheet material to render the minor portion passed therebetween sufficiently pliable whereby the portion of the sheet material 20 immediately adjacent the inside edge 12 of the convolute tube formed during convolute winding is readily conformable to the contour of the inside surface of the convolute tube. Apron 17 and juncture portion 18 are formed by passing the minor portion of the sheet material 20 immediately adjacent edge 24 of the convolute tube being formed between corrugating rolls 41, 42.

At adhesive applying station 35, a suitable adhesive 14 is applied longitudinally of the sheet material 20 by an applicator roll 51 which rotates in contact with the first surface 21 of the sheet material 20 transversely thereof. A transfer roll 52 dips into an adhesive container 53 and transfers the adhesive 14 from the container 53 to the applicator roll 51 which applies the adhesive 14 to the first surface 21 of the sheet material 20. As illustrated, the applicator roll 51 is made substantially equal to the width of the sheet material 20 in order to apply adhesive 14 throughout the first surface 21. However, in certain instances, for example when forming apron 17, it may be desirable not to apply adhesive to certain portions of the sheet material 20 and in such instances, doctor blades or the like may be provided that cooperate with applicator roll 51 to remove the adhesive 14 from portions thereof and thus not apply adhesive 14 to corresponding portions of the sheet material 20.

Beyond the cutting mechanism 40, the sheet material 20 having been cut into predetermined lengths is advanced on a platform, formed from a plurality of longitudinally extending and laterally spaced wires 54 whose near ends are suitably connected to the frame of the cutting station 40 (not shown) and whose far ends extend over a transverse bar 55, by means of advancing pins (not shown) operatively associated with the platform and extending from a movable frame. This advancement of the cut lengths of the sheet material 20 moves the first longitudinal edge 23 thereof into an aligned longitudinally extending groove 56 of a mandrel 57 which extends substantially parallel and longitudinally of the sheet material 20. This apparatus forms part of a conventional convolute tube winding machine well understood by those with ordinary skill in the art and further explanation herein is not believed necessary.

With the first longitudinal edge 23 of the sheet material 20 in the groove 56 of mandrel 57, as shown in the right-hand portion of FIG. 5, the mandrel 57 is rotated by a driving mechanism generally indicated at 58 (FIG. 4) to impart a predetermined number of revolutions to mandrel 57 to convolutely wind the sheet material 20 into a convolute tube 10 with the second surface 22 of the sheet material 20 forming the outside surface of the convolutely wound tube 10 and with the first longitudinal edge 23 forming the inside edge 12 of the convolutely wound tube 10. Thereafter, the convolutely wound tube 10 may be stripped from the mandrel 57 and the convolute winding machine made ready for the winding of another cut length of the elongate sheet material 20.

It is apparent that upon stripping the convolute tube from the mandrel 57 the portion of the sheet material held in the groove 56 of the mandrel 57 during winding is readily conformable to the contour of the inside surface of the convolute tube and upon conforming to that contour will be adhesively secured to the next outer convolute winding by adhesive 14 applied at adhesive applying station 35. Furthermore, it should be appreciated that irrespective of the winding technique, this invention has alleviated the problem heretofore presented of readily conforming the portion of the sheet material adjacent the inside edge of a convolutely wound tube to the contour of the inside surface of the convolute tube and enabling its securement to the next outer convolute winding. Furthermore, the instant invention resolves the problem caused by the failure of the apron to substantially conform to the outer surface of the convolute tube.

There is illustrated in FIG. 8 a pair of modified nip feeding rolls 38', 39' that include means for corrugating a minor portion of the sheet material 20 adjacent the first longitudinal edge 23 and which may be substituted for nip feeding rolls 38, 39 and used instead of the corrugating apparatus 34 previously described. In particular, the nip feeding rolls 38', 39' include cooperating corrugating roll portions 38a', 39a' disposed at one end thereof, respectively, and between which a minor portion of the sheet material adjacent first longitudinal edge 23 may be drawn during driving thereof to effect corrugation of the sheet material 20 longitudinally thereof. It is to be understood that corrugating roll portions 38a', 39a' may be located at either or both ends of nip feeding rolls 38', 39', depending on which portion is to be made more pliable.

In order to vary the nipping pressure between the modified rolls 38', 39' and especially between the corrugating roll portions 38a', 39a', the bottom roll 38' is rotatably mounted on support stands 61, 62 and intermittently driven by any conventional driving means (not shown) while the top roll 39' is held in pressing relation to the bottom roll 38' by adjustable pressure applying means, generally designated at 70, and which are disposed in cooperation with opposite ends of the top roll 39' to facilitate the application of equal pressure to opposite ends thereof. Accordingly, depending on the physical properties of the sheet material 20 being used, the nipping pressure between the feed rolls 38', 39' may be adjusted to control the penetration of the corrugations formed in the sheet material 20 to render the minor portion of the sheet material 20 passed therebetween sufficiently pliable whereby it is readily conformable to the contour of the surface of the convolute tube.

Similarly, the pair of nip feeding rolls 32, 33 may be modified in an equivalent manner to corrugate a minor portion of the sheet material 20 adjacent the first longitudinal edge 23 or second longitudinal edge 24, or both, thereof. Flap 17, alone or in combination with juncture portion 18, may be formed by corrugating a portion of the sheet material 20 of a width greater or less than the circumference of the tube 10. Although the preferred embodiment of the invention has been set forth in detail herein, it is to be understood that the instant invention relates to the breaking down of the strength of the sheet material and making such more pliable adjacent the edges thereof to effect conformance of the edges to the next convolute winding.

In the drawings and specification, there has been set forth a preferred embodiment of the invention, and although specific terms are employed, they are used in a generic and descriptive sense only and not for purposes of limitation.

What is claimed is:

1. A convolutely wound tube formed from a predetermined length of elongate sheet material having opposed surfaces and longitudinal side edges, said tube comprising a plurality of overlying convolute windings of the sheet material including inside and outside surfaces and edges formed by the opposed surfaces and the longitudinal edges of the sheet material; adhesive means for securing said convolute windings in the overlying relation and for securing said inside edge to the next outer convolute winding; a minor portion of the sheet material adjacent at least the outside edge of said tube being rendered more pliable than the major portion thereof and readily conformable to the contour of the surface of said convolute tube; the sheet material rendered more pliable forming a portion of the outside surface of said tube; and said adhesive means omitted from a minor portion of the sheet material adjacent the outside edge thereof to form a flap tube.

2. A convolutely wound tube as set forth in claim 1 wherein a minor portion only of said sheet material adjacent said inside edge of said tube is rendered more pliable than the major portion thereof and readily conformable to the contour of said inside surface of said convolute tube, said minor portion of the sheet material adjacent said inside edge rendered more pliable comprising a width substantially less than the circumference of the inside surface of said tube.

3. The convolutely wound tube of Claim 1 wherein said minor portion of said sheet material rendered more pliable comprises longitudinally extending corrugations rendering the sheet more pliable; and said minor portion rendered more pliable having a width substantially less than the circumference of the outside surface of said tube.

4. A convolutely wound tube as set forth in claim 3 wherein said minor portion of sheet material rendered more pliable extends a greater width than the width of the omitted adhesive, whereby a few only of said corrugations are adhered to the surface of said convolute tube.

* * * * *